United States Patent [19]

LeRoue

[11] Patent Number: 4,541,197
[45] Date of Patent: Sep. 17, 1985

[54] HOLLOW TELESCOPING FISHING ROD

[76] Inventor: Lloyd J. LeRoue, 726 S. 12th St., Yakima, Wash. 98901

[21] Appl. No.: 261,743

[22] Filed: May 8, 1981

[51] Int. Cl.[4] .............................................. A01K 87/00
[52] U.S. Cl. ..................................................... 43/18.1
[58] Field of Search ....................................... 43/18.1

[56] References Cited

U.S. PATENT DOCUMENTS

| | | | |
|---|---|---|---|
| 1,033,187 | 7/1912 | Metzger | 43/18.1 |
| 1,413,101 | 4/1922 | Cushing | 43/18.1 |
| 1,418,184 | 5/1922 | Trunick | 43/18.1 |
| 2,005,081 | 6/1935 | Gephart | 43/18.1 |
| 2,334,646 | 11/1943 | Price | 43/18.1 |
| 3,034,798 | 5/1962 | Portz | 43/18.1 |
| 3,417,500 | 12/1968 | Carabasse | 43/18.1 |
| 3,432,958 | 3/1969 | Bellinger et al. | 43/18.1 |
| 3,789,533 | 2/1974 | Bowerfind et al. | 43/18.1 |
| 4,024,666 | 5/1977 | Carver | 43/18.1 |
| 4,067,133 | 1/1978 | Livingston | 43/18.1 |
| 4,237,639 | 12/1980 | Uemori et al. | 43/18.1 |

Primary Examiner—Nicholas P. Godici
Assistant Examiner—Kurt Rowan
Attorney, Agent, or Firm—Seed and Berry

[57] ABSTRACT

A novel telescoping fishing rod comprises a handle having means for releasably attaching a fishing reel and a hollow pole to the handle. The pole has telescoping sections, each of which has an internal grommet which holds a line passing through the pole off the inner surface, allowing greater feel for the angler. A novel locking means allows interchange of poles and handles. The means has a plug and receptacle. The plug follows a keyway in the receptacle and is rotated into a second keyway, where its retraction is limited.

6 Claims, 7 Drawing Figures

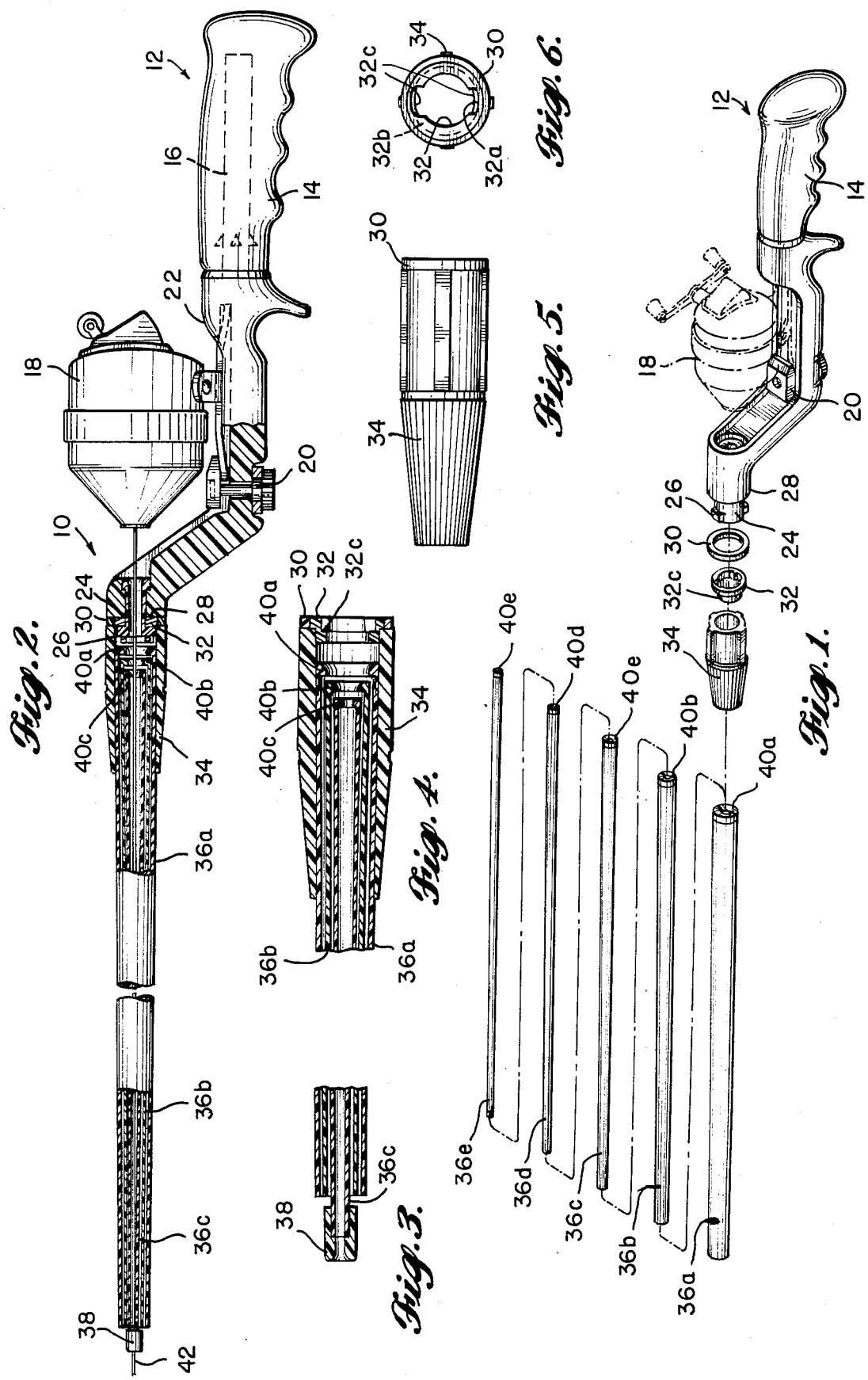

HOLLOW TELESCOPING FISHING ROD

DESCRIPTION

1. Technical Field

This invention relates to the art of fishing rods. More particularly, this invention discloses a hollow telescoping fishing rod.

2. Background Art

Commonly, fishing rods use poles having spaced eyes extending outwardly from the pole. The fishing line passes through the eyes and extends outwardly from the pole. Sometimes, upon rewinding the line or maneuvering with the pole, the line tangles with the eyes. The eyes also hinder storage of the rod and pole because, in projecting outwardly, they easily catch on the sides of the container.

To remove the tangling and storage problems, a hollow rod has a line that passes through a central bore within it. Feel is lost when playing a lure or fish, however, because the line drags over the entire length of pole. Casting is also hindered with this hollow pole due to the drag, so only heavily weighted lures can easily be cast appreciable distances.

DISCLOSURE OF INVENTION

A hollow telescoping fishing rod of this invention improves the ordinary rod or the common hollow rod by using grommets which project upwardly in its central bore to reduce the friction on the line by holding the line off its inner surface. The fishing line contacts the rod only in point contact at the spaced grommets. Therefore, the angler has much greater feel when he or she is playing a lure or fish. Even when the rod bends under the pull of a fish, the grommets tend to hold the line away from a substantial part of the inner surface. The grommets also improve the casting capability of this hollow rod through the point contact with the line. Thus the rod of this invention not only reduces the tangling and storage problems of rods having outwardly projecting eyes, but it provides further improvements over rods which also resolve the tangling and storage problems.

Furthermore, a novel locking means for this rod allows interchange of poles with a common handle. The handle has a key plug which fits into a receptacle's keyway on the pole. Twisting the receptacle relative to the plug locks the pole and handle together. With this locking means, various poles may be used on a single handle; therefore, an angler may change the length of pole or its flex, depending on the conditions in which he or she fishes.

BRIEF DESCRIPTION OF THE DRAWINGS

FIG. 1 is a exploded view of a fishing rod of this invention.

FIG. 2 is a partially sectional, side elevation of a fishing rod of this invention, showing details of this invention.

FIG. 3 is a detail of an end cap on the smallest telescoping section of a fishing rod of this invention.

FIG. 4 is a cross-section of a connector showing three telescoping sections enclosed therein.

FIG. 5 is a side elevation of a connector as shown in FIG. 4.

FIG. 6 is an end view of the connector shown in FIG. 5.

BEST MODE FOR CARRYING OUT THE INVENTION

Figure 7:
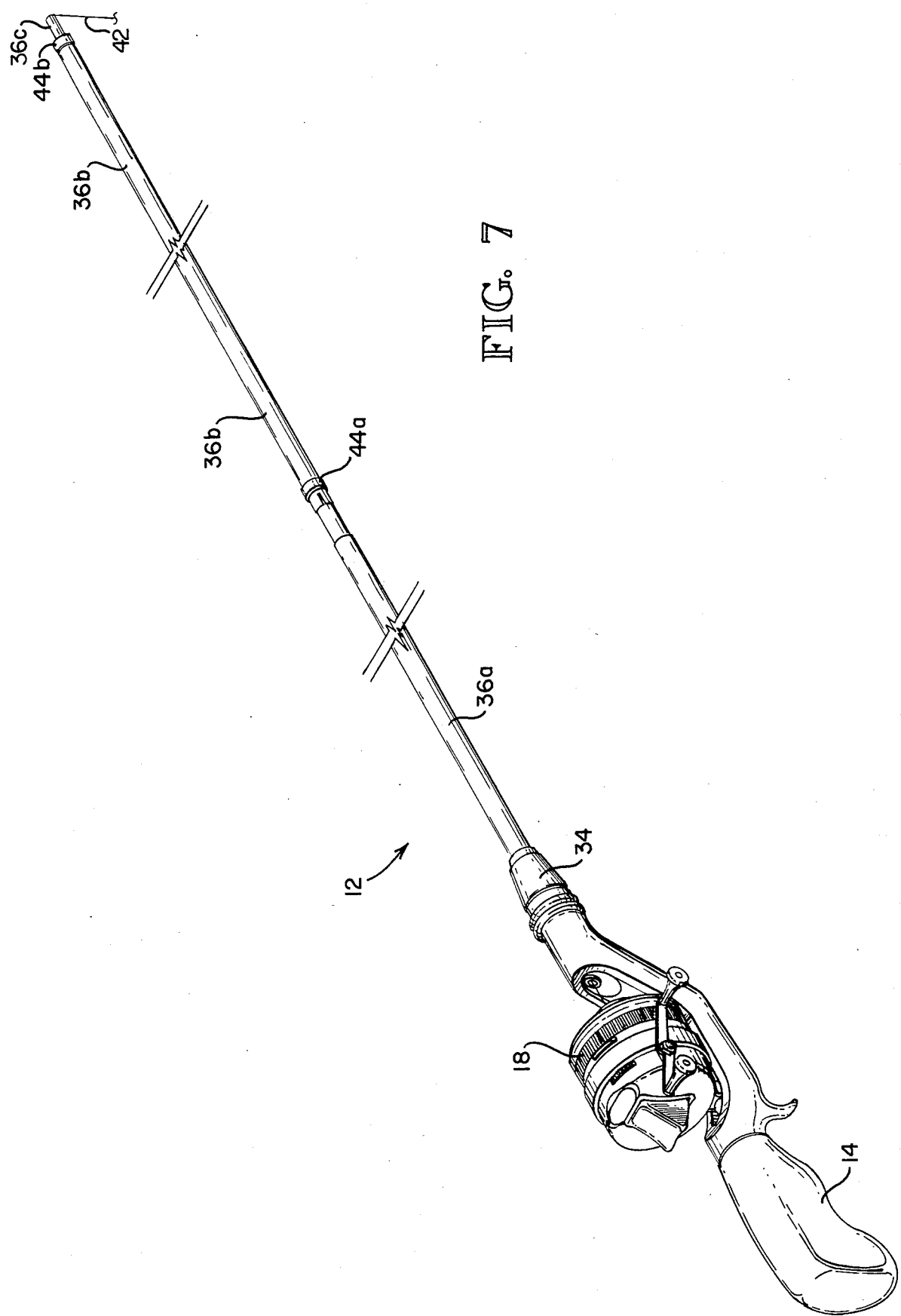
FIG. 7 is a perspective of another embodiment of the invention.

Referring now to FIGS. 1 and 2, a hollow telescoping fishing rod 10 of this invention has a handle 12 having a grip 14 of plastic, rubber or other suitable material encircling a central bore 16. A fishing reel 18, such as a spinning, fly, or casting reel, is releasably mounted onto the handle 12 with screw plate 20 and clip 22. The end of the handle 12 opposite the grip 14 includes a plug 24 having at least one upset key 26 projecting therefrom and a stop shoulder 28. The key is sized to mate with a first keyway 32a on the receptacle 32. Spacer ring 30 fits over the receptacle 32 and is glued thereto. Similarly, the receptacle 32 is glued to a connector 34. As best seen in FIGS. 4 and 6, the receptacle 32 has a first keyway 32a projecting inwardly to receive the key 26 of the plug 24 and a second keyway 32b behind a rim to receive the key 26 when the receptacle 32 and connector 34 are rotated relative to the plug 24. A stop shoulder 32c may be placed on the receptacle 32 to limit insertion of the plug 34 into the receptacle 32. Such a stop 32c allows ready insertion and identifies for the angler the intersection for the second keyway 32b. When the stop 32b is hit, the angler can rotate the receptacle 32 relative to the plug 24. The plug and receptacle thus form a locking means by which various types of poles can be connected to the handle.

As shown, the plug 24 has two keys 26 which are diametrically opposed. This configuration is preferred, although many others are possible. Also, the second keyway 32c need not be a radial groove in the receptacle 32, but it may have at least one stop to limit rotation of the key and plug relative to the receptacle. The stop will insure that the key is misaligned with the first keyway (insuring that the pole is locked on the handle).

Telescoping pole sections 36a–36e fit within one another and within the connector 34. Each section slides along the entire length of the next larger section and is restricted from falling out the small end of each telescoping section. As seen in FIG. 3, an end cap 38 is glued onto the smallest telescoping section 36c so that this section may not be withdrawn into the next larger telescoping section 36b. Each telescoping section 36a–36e has a grommet 40a–40e attached at its large end. Each grommet projects inwardly into the hollow cavity of the section and forms a point contact for a line 42 which passes from reel 18 through the pole sections 36a–36e and out. These grommets 40a–40e hold the line 42 off the internal surface of the pole sections 36a–36e, reducing friction on the line and giving the angler greater feel when playing a lure or fish.

Between every two telescoping pole sections 36a–36c in one embodiment is a pressure ring 44a and 44b (as shown in FIG. 7). The ring 44a or 44b allows the length of the pole to be adjusted and fixed. To set the length, the pressure ring is pulled from its seat on the end of the larger pole section and the desired length of the smaller pole section is extracted from within the larger. This length of the smaller section is fixed by wedging the pressure ring back between the larger and smaller sections to its seat on the end of the larger section. Other suitable means to perform and weding may be used.

Because those skilled in the art will recognize modifications to the specific embodiments shown and described which do not depart from the principles of this invention, this invention should not be limited to the specific embodiments unless limitation is necessary due to the teachings of the prior art or the nature and spirit of the appended claims.

I claim:

1. A fishing rod comprising:
   (a) a handle having a grip at one end, attachment means for connecting a fishing reel to the handle, a crooked neck at the other end, and an opening within the neck for receiving a line from the reel when the reel is attached to the handle;
   (b) a hollow pole attached to the neck of the pole so that a central bore of the pole aligns with the opening of the neck, the pole including a plurality of telescoping sections, each section having an inner end nearer the handle and an outer end;
   (c) a grommet for each section of the pole, each grommet attached to the section only at the inner end edge of a section to allow uninterfered telescopic extension and retraction of each section along the entire length of the adjacent section, the grommets having an internal diameter slightly less than the internal diameter of the bore of its respective pole section, the grommets holding the line off the inner surface of the pole, except essentially at each grommet, thereby reducing drag on the line; and
   (d) releasable locking means on the neck and pole for interconnecting the pole and handle, the means including a receptacle about the innermost section of the pole and a corresponding plug attached to the crooked neck about the opening.

2. The rod of claim 1 wherein the receptacle includes a longitudinal keyway and an intersecting transverse keyway, and wherein the plug includes an upset key projecting from the outer surface of a plug on the neck of the handle, the key being received in the keyways to interconnect the handle and pole.

3. The rod of claim 1, further comprising pressure rings between each pair of sections of the pole for varying the length of the pole, each pressure ring being adapted for fixing the position of one section relative to the other at predetermined points of extension of the pole.

4. The rod of claim 3 wherein the pressure rings wedge between the sections at the outer end of the inner section of each pair of pole sections.

5. The rod of claim 2, further comprising a stop on the neck of the handle to limit penetration of the key into the receptacle.

6. The rod of claim 1 wherein the outer end of each section nearer the handle has an internal diameter less than the outside diameter of the inner end of the next section so that the sections will not separate when extended away from the handle.

* * * * *